(12) United States Patent
Wang et al.

(10) Patent No.: US 10,419,991 B2
(45) Date of Patent: Sep. 17, 2019

(54) DATA TRANSMISSION METHOD AND SYSTEM, AND RELATED APPARATUS

(71) Applicant: HUAWEI TECHNOLOGIES CO., LTD., Shenzhen (CN)

(72) Inventors: Bin Wang, Shanghai (CN); Enbo Wang, Shanghai (CN); Qiyong Zhao, Shanghai (CN); Chenghui Peng, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/348,171

(22) Filed: Nov. 10, 2016

(65) Prior Publication Data

US 2017/0064596 A1    Mar. 2, 2017

Related U.S. Application Data

(63) Continuation of application No. PCT/CN2014/081972, filed on Jul. 10, 2014.

(51) Int. Cl.
*H04W 36/08* (2009.01)
*H04W 24/02* (2009.01)
(Continued)

(52) U.S. Cl.
CPC .......... *H04W 36/08* (2013.01); *H04W 24/02* (2013.01); *H04W 28/06* (2013.01); *H04W 36/00* (2013.01);
(Continued)

(58) Field of Classification Search
CPC ... H04W 36/08; H04W 28/06; H04W 56/001; H04W 36/0061; H04W 36/00;
(Continued)

(56) References Cited

U.S. PATENT DOCUMENTS 8,516,158 B1   8/2013   Wu et al.
8,565,689 B1  10/2013   Rubin et al.
(Continued)

FOREIGN PATENT DOCUMENTS

CN   101436984 A   5/2009
CN   103260187 A   8/2013
(Continued)

OTHER PUBLICATIONS

Combined International Search Report dated Apr. 16, 2015 in PCT/CN2014/081972 (with English translation of Category of Cited Documents).
(Continued)

*Primary Examiner* — Nathan A Mitchell
(74) *Attorney, Agent, or Firm* — Oblon, McClelland, Maier & Neustadt, L.L.P.

(57) ABSTRACT

Embodiments of the present application disclose a data transmission method and system, and a related apparatus. The method in the embodiments of the present application includes: when a network-side data transmission apparatus detects that a terminal is handed over from being served by a source base station to being served by a target base station, determining whether the source base station and the target base station have a wireless network transmission optimization (WNTO) technical capability; and completing transmission of uplink data or downlink data according to each determined WNTO technical capability of the source base station and the target base station, which effectively improves data transmission efficiency in a wireless network.

7 Claims, 7 Drawing Sheets

When detecting that a terminal is handed over from being served by a source base station to being served by a target base station, a network-side data transmission apparatus determines whether the source base station and the target base station have a wireless network transmission optimization WNTO technical capability    /  201

Complete transmission of uplink data or downlink data according to each determined WNTO technical capability of the source base station and the target base station    /  202

(51) Int. Cl.
  *H04W 36/00*  (2009.01)
  *H04W 28/06*  (2009.01)
  *H04W 56/00*  (2009.01)
  *H04L 29/06*  (2006.01)
  *H04W 88/16*  (2009.01)
  *H04W 92/12*  (2009.01)

(52) U.S. Cl.
  CPC ..... *H04W 36/0061* (2013.01); *H04W 56/001* (2013.01); *H04L 69/04* (2013.01); *H04W 36/0033* (2013.01); *H04W 88/16* (2013.01); *H04W 92/12* (2013.01)

(58) Field of Classification Search
  CPC ..... H04W 24/02; H04W 92/12; H04W 88/16; H04W 36/0033; H04L 69/04
  See application file for complete search history.

(56) References Cited

U.S. PATENT DOCUMENTS

| | | | |
|---|---|---|---|
| 9,743,318 B2* | 8/2017 | Persson | H04W 36/0022 |
| 9,788,353 B2* | 10/2017 | Li | H04W 76/022 |
| 2008/0188223 A1 | 8/2008 | Vesterinen et al. | |
| 2009/0016334 A1 | 1/2009 | Forsberg et al. | |
| 2009/0219930 A1* | 9/2009 | Dolganow | H04L 69/04 |
| | | | 370/389 |
| 2010/0263021 A1* | 10/2010 | Arnott | H04L 63/20 |
| | | | 726/1 |
| 2010/0322151 A1* | 12/2010 | Racz | H04W 28/06 |
| | | | 370/328 |
| 2011/0058530 A1* | 3/2011 | Kim | H04W 36/0055 |
| | | | 370/331 |
| 2013/0315209 A1* | 11/2013 | Murakami | H04W 28/065 |
| | | | 370/331 |
| 2013/0322346 A1* | 12/2013 | Comeau | H04W 80/02 |
| | | | 370/329 |
| 2014/0211620 A1* | 7/2014 | Kubota | H04L 69/04 |
| | | | 370/230 |
| 2015/0003476 A1 | 1/2015 | Zhang et al. | |
| 2016/0142518 A1* | 5/2016 | Raina | H04L 69/04 |
| | | | 370/230 |
| 2016/0142951 A1* | 5/2016 | Balasubramanian | H04W 36/0033 |
| | | | 370/331 |
| 2016/0262066 A1* | 9/2016 | Ozturk | H04W 36/08 |

FOREIGN PATENT DOCUMENTS

| | | |
|---|---|---|
| CN | 103533586 A | 1/2014 |
| WO | WO 2009/007109 A2 | 1/2009 |
| WO | WO 2009/007109 A3 | 1/2009 |

OTHER PUBLICATIONS

Partial Supplementary European Search Report dated Nov. 21, 2016 in European Patent Application No. 14897044.5.

"3rd Generation partnership Project; Technical Specification Group Radio Access Network; Packet Data Convergence Protocol (PDCP) specification (Release 11)" 3GPP TS 25.323, Sep. 2012, vol. 11.0.0, pp. 1-43.

M. Degermark, et al., "IP Header Compression". The Internet Society, RFC 2507, Feb. 1999, pp. 1-47.

C. Bormann, et al., "Robust Header Compression (ROHC): Framework and four profiles: RTP, UDP, ESP and uncompressed", The Internet Societry, RFC 3095, Jul. 2001, pp. 1-168.

\* cited by examiner

DATA TRANSMISSION METHOD AND SYSTEM, AND RELATED APPARATUS

CROSS-REFERENCE TO RELATED APPLICATIONS

This application is a continuation of International Application No. PCT/CN2014/081972, filed on Jul. 10, 2014, which is hereby incorporated by reference in its entirety.

TECHNICAL FIELD

The present application relates to the communications field, and in particular, to a data transmission method and system, and a related apparatus.

BACKGROUND

The development of mobile service has resulted in increasing requirements on bandwidth of the Backhaul. To optimize a wireless network transmission system and improve competitiveness of a base station, station expansion needs to be implemented and transmission in the Backhaul needs to be optimized. For example, a protocol header of a data flow transmitted at a Packet Data Convergence Protocol (PDCP) layer is compressed at the Packet Data Convergence Protocol layer of a wireless air interface protocol stack, or a program related to a user data application layer compresses data of the user data application layer. However, only the protocol header of user data is compressed at the PDCP layer, which is applicable only to a single user and a scenario in which a protocol payload is relatively small. When the protocol payload is relatively large, a compression effect is not obvious, and network transmission cannot be optimized effectively. Compressing at the user data application layer depends on whether the application is configured with a compression function; when the application is not configured with the compression function, network transmission cannot be optimized.

To effectively optimize network transmission, a network transmission optimization (NTO) technology is provided in the prior art, where performance of a network or an application is improved by using technologies such as traffic reduction, traffic compression, traffic cache, and protocol acceleration, and data of a single user in a relatively wide region or duplicated data of different users on a same link can be compressed and optimized.

However, the NTO technology needs to be deployed in pairs at both ends of a to-be-optimized network, that is, after data is compressed at one end of the network, the data needs to be decompressed at the other end of the network. In a wireless network, when a terminal is handed over between base stations, a target base station may fail to effectively decompress data because of different protocols for compressing the data by a source base station, and therefore, the NTO technology cannot work normally in the wireless network.

SUMMARY

Embodiments of the present application provide a data transmission method and system, and a related apparatus, to effectively improve data transmission efficiency in a wireless network.

According to a first aspect, the present application provides a data transmission method, and the data transmission method may include:

when a network-side data transmission apparatus detects that a terminal is handed over from being served by a source base station to being served by a target base station, determining whether the source base station and the target base station have a wireless network transmission optimization (WNTO) technical capability; and completing transmission of uplink data or downlink data according to each determined WNTO technical capability of the source base station and the target base station.

In a first possible implementation manner of the first aspect, the determining, by the data transmission apparatus, whether the source base station and the target base station have a wireless network transmission optimization WNTO technical capability specifically includes: determining, by the data transmission apparatus, that both the source base station and the target base station have the WNTO technical capability; and the completing transmission of uplink data or downlink data according to each determined WNTO technical capability of the source base station and the target base station specifically includes: receiving, by the data transmission apparatus, compressed uplink data obtained after the target base station compresses the uplink data by using a WNTO technology, and sending decompressed uplink data after decompressing the compressed uplink data; or sending, by the data transmission apparatus, a synchronization command message to the source base station, so that the source base station synchronizes a fingerprint database to the target base station, where the synchronization command message carries an identifier of the terminal and an identifier of the target base station; and when the source base station successfully synchronizes the fingerprint database to the target base station, compressing, by the data transmission apparatus, the downlink data by using a WNTO technology, and sending, to the target base station, compressed downlink data obtained after the downlink data is compressed by using the WNTO technology, so that the target base station decompresses the compressed downlink data according to the fingerprint database by using the WNTO technology.

In a second possible implementation manner of the first aspect, the determining, by the data transmission apparatus, whether the source base station and the target base station have a wireless network transmission optimization WNTO technical capability specifically includes: determining, by the data transmission apparatus, that the target base station has the WNTO technical capability and the source base station does not have the WNTO technical capability; and the completing transmission of uplink data or downlink data according to each determined WNTO technical capability of the source base station and the target base station specifically includes: receiving, by the data transmission apparatus, compressed uplink data obtained after the target base station compresses the uplink data by using a WNTO technology, and sending decompressed uplink data after decompressing the compressed uplink data; or compressing, by the data transmission apparatus, the downlink data by using a WNTO technology, and sending, to the target base station, compressed downlink data obtained after the downlink data is compressed by using the WNTO technology, so that the target base station decompresses the compressed downlink data according to a preset fingerprint database.

In a third possible implementation manner of the first aspect, the determining, by the data transmission apparatus, whether the source base station and the target base station have a wireless network transmission optimization WNTO technical capability specifically includes: determining, by the data transmission apparatus, that the target base station does not have the WNTO technical capability and the source base station has the WNTO technical capability, and the completing transmission of uplink data or downlink data according to each determined WNTO technical capability of the source base station and the target base station specifically includes: after receiving the uplink data sent by the target base station, directly sending, by the data transmission apparatus, the uplink data; or directly sending the downlink data to the target base station.

With reference to any one of the first aspect, or the first to the third possible implementation manners of the first aspect, in a fourth possible implementation manner, a process of determining whether the source base station and the target base station have the WNTO technical capability when it is detected that the terminal is handed over from being served by the source base station to being served by the target base station specifically includes: detecting whether the terminal is handed over; if the terminal is handed over, obtaining the identifier of the terminal, an identifier of the source base station, and the identifier of the target base station; and determining, according to the identifier of the source base station, whether the source base station has the WNTO technical capability, and determining, according to the identifier of the target base station, whether the target base station has the WNTO technical capability.

With reference to the first possible implementation manner of the first aspect, in a fifth possible implementation manner, when the source base station does not successfully synchronize the fingerprint database to the target base station, the data transmission apparatus directly sends the uplink data after receiving the uplink data sent by the target base station; or directly sends the downlink data to the target base station.

According to a second aspect, the present application provides a data transmission method, and the data transmission method may include:

receiving, by a source base station, a synchronization command message, where the synchronization command message carries an identifier of a terminal and an identifier of a target base station; and extracting a fingerprint database according to the identifier of the terminal, and synchronizing the fingerprint database to the target base station.

In a first possible implementation manner of the second aspect, the extracting a fingerprint database according to the identifier of the terminal, and synchronizing the fingerprint database to the target base station specifically includes: extracting the fingerprint database according to the identifier of the terminal, and synchronizing the fingerprint database to the target base station through an X2 or S1 interface.

With reference to the second aspect or the first possible implementation manner of the second aspect, in a second possible implementation manner, after the step of synchronizing the fingerprint database to the target base station, the method further includes: sending, by the source base station, a synchronization command response message to a network-side data transmission apparatus, where the synchronization command response message includes a fingerprint database synchronization result.

According to a third aspect, the present application provides a data transmission apparatus, and the data transmission apparatus may include:

a detection module, configured to detect that a terminal is handed over from being served by a source base station to being served by a target base station;

a determining module, configured to: when the detection module detects that the terminal is handed over from being served by the source base station to being served by the target base station, determine whether the source base station and the target base station have a WNTO technical capability; and a transmission module, configured to complete transmission of uplink data or downlink data according to each determined WNTO technical capability of the source base station and the target base station.

In a first possible implementation manner of the third aspect, the transmission module is further configured to: when the determining module determines that both the target base station and the source base station have the WNTO technical capability, receive compressed uplink data obtained after the target base station compresses the uplink data by using a WNTO technology, and send decompressed uplink data after decompressing the compressed uplink data; or send a synchronization command message to the source base station, so that the source base station synchronizes a fingerprint database to the target base station, where the synchronization command message carries an identifier of the terminal and an identifier of the target base station; and when the source base station successfully synchronizes the fingerprint database to the target base station, compress the downlink data by using a WNTO technology, and send, to the target base station, compressed downlink data obtained after the downlink data is compressed by using the WNTO technology, so that the target base station decompresses the compressed downlink data according to the fingerprint database by using the WNTO technology.

In a second possible implementation manner of the third aspect, the transmission module is further configured to: when the determining module determines that the target base station has the WNTO technical capability and the source base station does not have the WNTO technical capability, receive compressed uplink data obtained after the target base station compresses the uplink data by using a WNTO technology, and send decompressed uplink data after decompressing the compressed uplink data; or compress the downlink data by using a WNTO technology, and send, to the target base station, compressed downlink data obtained after the downlink data is compressed by using the WNTO technology, so that the target base station decompresses the compressed downlink data according to a preset fingerprint database.

In a third possible implementation manner of the third aspect, the transmission module is further configured to: when the determining module determines that the target base station does not have the WNTO technical capability and the source base station has the WNTO technical capability, directly send the uplink data after receiving the uplink data sent by the target base station; or directly send the downlink data to the target base station.

With reference to any one of the third aspect, or the first to the third possible implementation manners of the third aspect, in a fourth possible implementation manner, the determining module is further configured to: when the detection module detects that the terminal is handed over from being served by the source base station to being served by the target base station, determine the identifier of the terminal, an identifier of the source base station, and the identifier of the target base station; and determine, according to the identifier of the source base station, whether the source base station has the WNTO technical capability, and determine, according to the identifier of the target base station, whether the target base station has the WNTO technical capability.

With reference to the first possible implementation manner of the third aspect, in a fifth possible implementation manner, the transmission module is further configured to: when the source base station does not successfully synchronize the fingerprint database to the target base station, directly send the uplink data after receiving the uplink data sent by the target base station; or directly send the downlink data to the target base station.

According to a fourth aspect, the present application provides a data transmission apparatus, and the data transmission apparatus includes: a bus, and a processor, a memory, and an interface that are connected to the bus, where the interface is configured to communicate with another network element, the memory is configured to store an instruction, and the processor executes the instruction to perform the data transmission method provided in the first aspect.

According to a fifth aspect, the present application provides a data transmission apparatus, and the data transmission apparatus may include:

a receiving module, configured to receive a synchronization command message, where the synchronization command message carries an identifier of a terminal and an identifier of a target base station; and a synchronization module, configured to: extract a fingerprint database according to the identifier of the terminal, and synchronize the fingerprint database to the target base station.

In a first possible implementation manner of the fifth aspect, the data transmission apparatus may further include: a response module, configured to send a synchronization command response message, where the synchronization command response message includes a fingerprint database synchronization result.

According to a sixth aspect, the present application provides a data transmission system, and the data transmission system may include: the data transmission apparatus, the source base station, and the target base station provided in the third aspect.

It can be learned from the foregoing technical solution that the embodiments of the present application have the following advantages:

In the embodiments of the present application, when a network-side data transmission apparatus detects that a terminal is handed over from being served by a source base station to being served by a target base station, whether the source base station and the target base station have a wireless network transmission optimization WNTO technical capability is determined, and transmission of uplink data or downlink data is completed according to each determined WNTO technical capability of the source base station and the target base station, which can effectively improve data transmission efficiency in a wireless network.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person skilled in the art may still derive other drawings from these accompanying drawings without creative efforts.

DESCRIPTION OF EMBODIMENTS

Figures 1, 2:
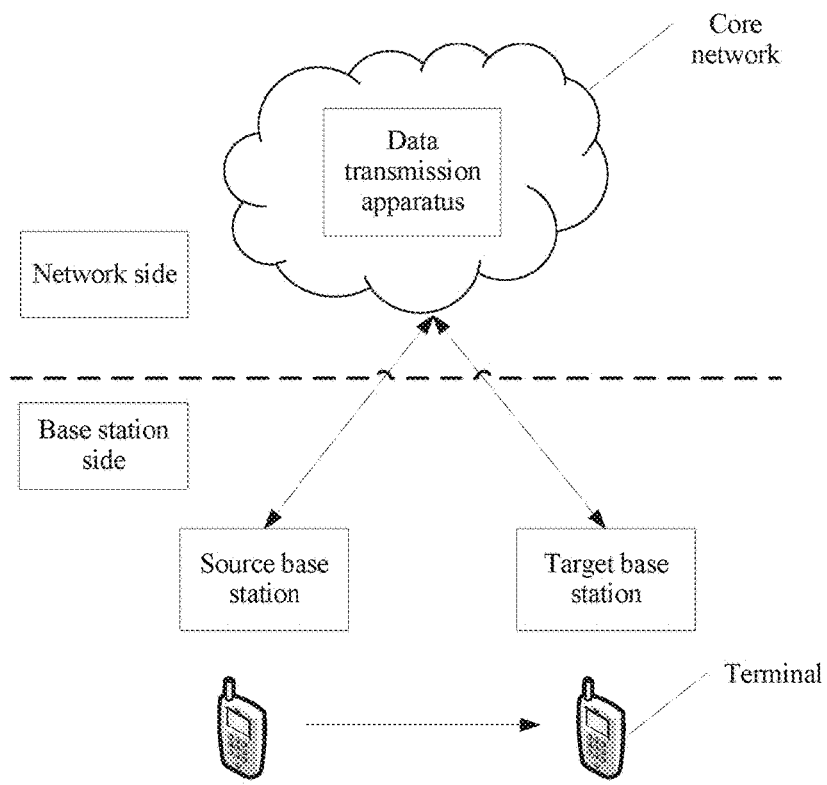
FIG. 1 is a schematic diagram of an applicable system architecture according to an embodiment of the present application.
FIG. 2 is a schematic flowchart of a data transmission method according to an embodiment of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person skilled in the art based on the embodiments of the present application without creative efforts shall still fall within the protection scope of the present application.

It should be first noted that a Long Term Evolution (LTE) network is used as an example for description in some embodiments of the present application, but the present application may not only be applied to the Long Term Evolution (LTE) network, but also use any of multiple communications standards, protocols, and technologies, such as Global System for Mobile Communications (GSM), Enhanced Data rates for GSM Evolution (EDGE), WiMAX (802.16), Wideband Code Division Multiple Access (WCDMA), Time Division Multiple Access (TDMA), Code Division Multiple Access (CDMA), Wi-Fi, Bluetooth, Zigbee, 802.15, VoIP, a short message service (SMS), or another suitable communications protocol and technology, which includes a communications protocol that has not been developed or determined on the date of submitting the file. In addition, a network in the embodiments may be the Internet, one or more Intranets, a local area network (LAN), a wide area network (WAN), a storage area network (SAN), or a suitable combination thereof.

A wireless network transmission optimization (WNTO) technology used in the embodiments of the present application is based on a network transmission optimization (NTO) technology widely used in fixed networks such as the Internet and a corporate network.

The NTO technology may improve performance of a network or an application by using technologies such as traffic reduction, traffic compression, traffic cache, and protocol acceleration. The NTO technology includes data deduplication, traditional data compression (for example, an algorithm of a Lempel-Ziv family), a caching mechanism, protocol acceleration, for example, Transmission Control Protocol (TCP) transmission optimization and Hypertext Transfer Protocol (HTTP) optimization, and the like, and the foregoing technologies may be used independently or may be used in combination, to achieve objectives of reducing bandwidth occupation and reducing a network delay. In the data deduplication technology, which is different from the traditional data compression algorithm that is only for data compression of data of a single user in a local region, data of a single user in a relatively wide region or duplicated data of different users on a same link can be compressed, and a better compression effect can be achieved. The NTO technology is deployed in pairs at both ends of an optimized network, and data flow in an uplink direction or in a downlink direction can be processed. The NTO technologies at the both ends of the network include: a TCP/IP protocol parsing module, a TCP/IP protocol encapsulation module, a data deduplication and compression module, and a data decompression and restoration module; and specific implementation may be as follows:

1. The TCP/IP protocol parsing module reassembles IP fragments of an incoming standard IP data packet, parses a transport layer protocol, and obtains application layer data and reassembles TCP sessions if a transport layer is the TCP protocol.

2. The data deduplication and compression module slices application data, generates fingerprints (digital digests of data slices) for slices, establishes an index structure between the fingerprints and original data, generates a fingerprint database, synchronizes fingerprint databases of both ends of a network, determines, according to the fingerprints, whether duplicated data slices exist, replaces the duplicated data slices with fingerprints, recodes the fingerprints and unduplicated data slices, selects a traditional compression algorithm of the Lempel-Ziv family to perform compression, and generates new application data.

3. The data decompression and restoration module decompresses, into the original data, the application data obtained after the data deduplication and compression module performs deduplication and compression, identifies the fingerprints and the unduplicated data slices, queries the fingerprint database, restores the original data, and assembles original data slices into an entirety.

4. The TCP/IP protocol encapsulation module re-encapsulates, into a standard IP data packet, application layer data obtained after the data deduplication and compression module performs recoding.

During deployment of the NTO technology in a wireless network, because base stations are different in geographic locations, traffic volumes, traffic modes, and the like, the NTO technology may be deployed in only some of the base stations. When a terminal is handed over between base stations, the terminal may be handed over from a base station that supports NTO to a base station that does not support the NTO, may be handed over from a base station that does not support NTO to a base station that supports the NTO, or may be handed over from a base station that supports NTO to a base station that supports the NTO, and therefore, the NTO technology cannot work normally.

A mobility support method is designed in the embodiments of the present application to resolve a problem that is brought about when a terminal is handed over in a mobile scenario, so that the NTO technology is successfully deployed in a wireless network. In the embodiments of the present application, the NTO technology deployed in the wireless network is defined as a wireless network transmission optimization (WNTO) technology. The WNTO technology can effectively improve data transmission efficiency in the wireless network, and correspondingly decrease link bandwidth of data transmission. Correspondingly, in the embodiments of the present application, having a WNTO technical capability specifically includes: compressing and/or decompressing uplink data or downlink data by using the foregoing modules. In addition, the embodiments of the present application further provide a corresponding data transmission apparatus, and a related system. The following provides detailed descriptions separately by using specific embodiments.

As shown in FIG. 1, a data transmission method provided in an embodiment of the present application is applicable to a wireless network environment in which a terminal is handed over from being served by a source base station to being served by a target base station. The wireless network includes a network side and a base station side, where a network-side device includes a core network, and the core network has functions of service authentication, service authorization, service charging, and the like, and has functions of data compression, data transmission, and data forwarding. A base station-side device includes a source base station and a target base station. Data transmitted from the network side to the base station side is defined as downlink data transmission, and data transmitted from the base station side to the network side is defined as uplink data transmission.

This embodiment of the present application provides the data transmission method, and the following provides description from the perspective of a network side. A network-side network element includes a data transmission apparatus, and the data transmission apparatus has a WNTO technical capability, and has a fingerprint database of all base stations that have the WNTO technical capability and that are connected to the data transmission apparatus. The data transmission apparatus may be deployed in a WNTO gateway manner, and may be deployed as an independent device, or may be integrated into a network element of a core network in a hardware or software module form. For example, in an LTE network, the data transmission apparatus may be integrated into a security gateway Sec GW or a service gateway S-GW.

As shown in FIG. 2, FIG. 2 is a schematic flowchart of a data transmission method according to an embodiment of the present application, and the data transmission method may include:

Step 201: When detecting that a terminal is handed over from being served by a source base station to being served by a target base station, a network-side data transmission apparatus determines whether the source base station and the target base station have a wireless network transmission optimization WNTO technical capability.

The network-side data transmission apparatus may detect, according to a change of a mapping relationship between a 5-tuple of an Internet Protocol (IP) data packet in a payload of a general packet radio service Tunneling Protocol-User Plane (GTP-U) and a lower-layer IP address of the GTP-U, whether the terminal is handed over. When the terminal is handed over from being served by the source base station to being served by the target base station, the data transmission apparatus may obtain an identifier of the terminal that is handed over, an identifier of the source base station, and an identifier of the target base station.

Step 202: Complete transmission of uplink data or downlink data according to each determined WNTO technical capability of the source base station and the target base station. The uplink data corresponds to data sent from a base station side to the network-side data transmission apparatus, and the downlink data corresponds to data sent from the network-side data transmission apparatus to the base station side, where the base station side includes the source base station and the target base station.

Figure 3A:
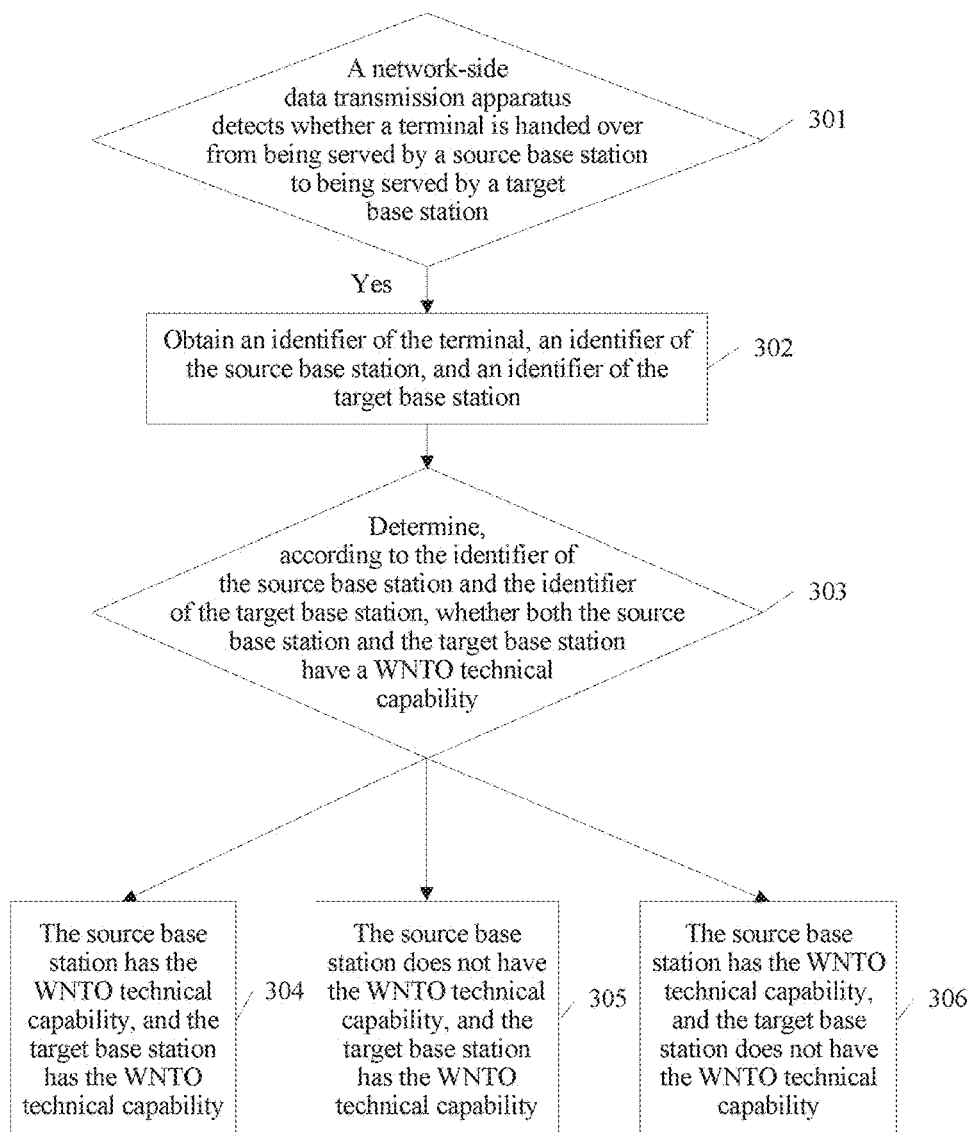
FIG. 3a is a general schematic flowchart of a data transmission method according to an embodiment of the present application.

To better understand the foregoing solution, the following describes the foregoing solution in detail. As shown in FIG. 3a, FIG. 3a is a general schematic flowchart of a data transmission method according to an embodiment of the present application.

Step 301: A network-side data transmission apparatus detects whether a terminal is handed over from being served by a source base station to being served by a target base station.

Step 302: If the terminal is handed over, obtain an identifier of the terminal, an identifier of the source base station, and an identifier of the target base station. The network-side data transmission apparatus may detect, according to a change of a mapping relationship between a 5-tuple of an IP data packet in a payload of a GTP-U and a lower-layer IP address of the GTP-U, whether the terminal is handed over. When the terminal is handed over from being served by the source base station to being served by the target base station, a lower-layer IP address of the GTP-U is changed from an IP address of the source base station to an IP address of the target base station, and the network-side data transmission apparatus determines, according to a change status of the lower-layer IP address of the GTP-U, that the terminal is handed over, and obtains, by using a 5-tuple of an IP data packet in a payload of the GTP-U, an IP address of the terminal that is handed over. The 5-tuple of the IP data packet in the payload of the GTP-U includes a source IP address, a target IP address, a source port number, a target port number, and a protocol number. Then the network-side data transmission apparatus queries a configured database according to an IP address, and the identifier of the terminal, the identifier of the source base station, and the identifier of the target base station may be obtained.

Step 303: Determine, according to the identifier of the source base station and the identifier of the target base station, whether both the source base station and the target base station have a WNTO technical capability. If the identifier of the source base station and the identifier of the target base station have a field definition of the WNTO technical capability, each WNTO technical capability of the source base station and the target base station may be obtained. That a base station has the WNTO technical capability indicates that a WNTO module is integrated into the base station in a software or hardware manner or is connected to the base station as an independent device, and the base station transmits uplink data and downlink data by using the WNTO module. This principle is applicable to the source base station and the target base station.

After step 303, this embodiment of the present application includes several different situations such as the following step 304, 305, or 306.

Step 304: Determine that the source base station has the WNTO technical capability and the target base station has the WNTO technical capability, and complete transmission of uplink data or downlink data according to the foregoing situation.

Step 305: Determine that the source base station does not have the WNTO technical capability and the target base station has the WNTO technical capability, and complete transmission of uplink data or downlink data according to the foregoing situation.

Step 306: Determine that the source base station has the WNTO technical capability and the target base station does not have the WNTO technical capability, and complete transmission of uplink data or downlink data according to the foregoing situation.

To better understand the foregoing solution, this embodiment of the present application provides details of step 304, and describes in detail how to transmit the uplink data and the downlink data in a scenario of step 304.

Figure 3B:
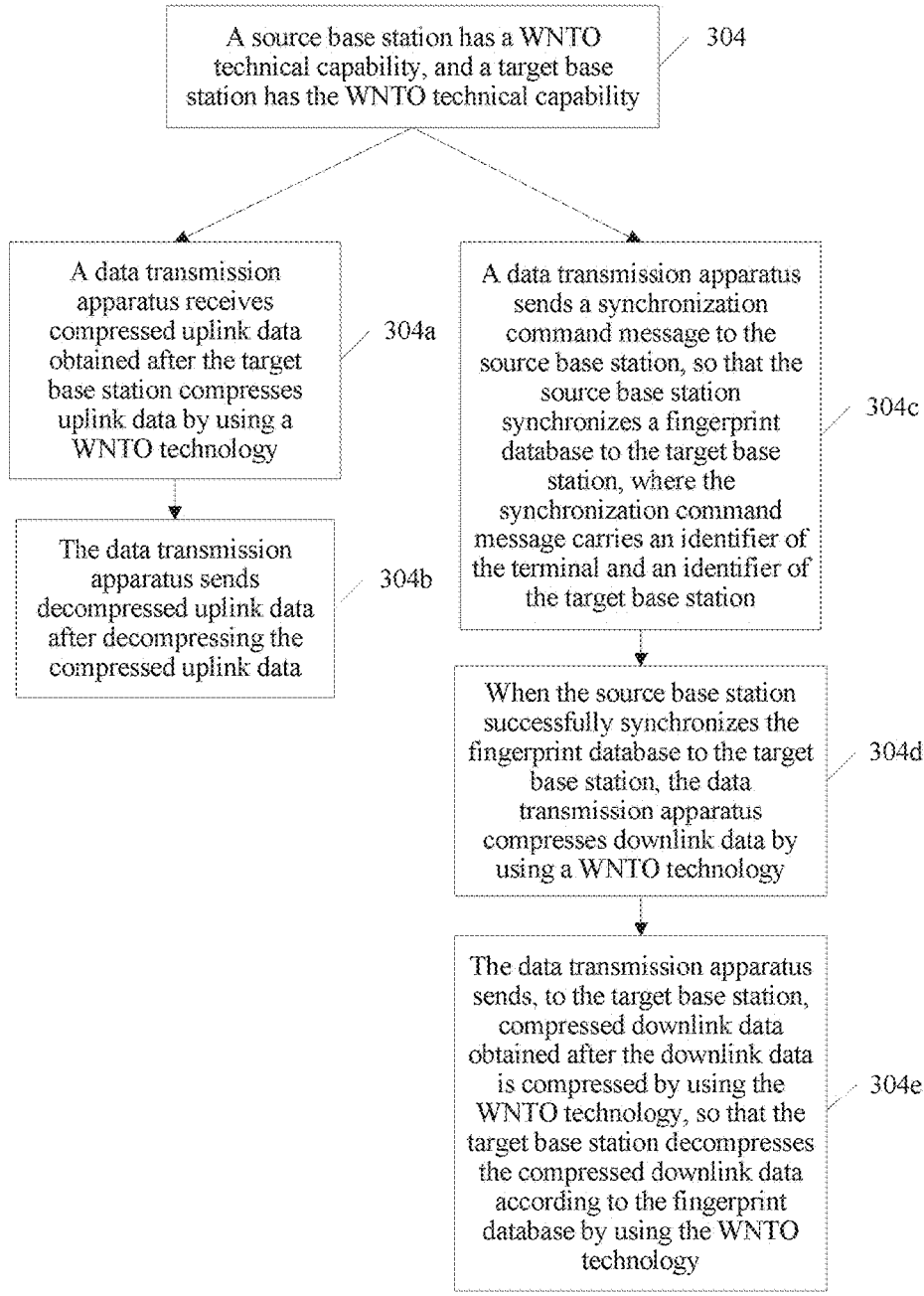
FIG. 3b is a first schematic sub-flowchart of a data transmission method according to an embodiment of the present application.

As shown in FIG. 3b, FIG. 3b is a first schematic sub-flowchart of a data transmission method according to an embodiment of the present application.

Step 304a: The data transmission apparatus receives compressed uplink data obtained after the target base station compresses the uplink data by using a WNTO technology. The target base station has the WNTO technical capability, and sends the compressed uplink data after compressing, by using the WNTO technology, the uplink data sent to the network-side data transmission apparatus.

Step 304b: The data transmission apparatus sends decompressed uplink data after decompressing the compressed uplink data. The network-side data transmission apparatus has a fingerprint database of all base stations that have the WNTO technical capability and that are connected to the data transmission apparatus, and can decompress the compressed uplink data according to a preset fingerprint database of the target base station by using the WNTO technology.

Step 304c: The data transmission apparatus sends a synchronization command message to the source base station, so that the source base station synchronizes a fingerprint database to the target base station, where the synchronization command message carries the identifier of the terminal and the identifier of the target base station. When both the source base station and the target base station have the WNTO technical capability, the target base station does not have the fingerprint database of the source base station, and cannot decompress data sent after the source base station compresses data by using the WNTO technology, and the target base station needs to send the synchronization command message to the source base station by using the data transmission apparatus, to request the source base station to synchronize the fingerprint database. The fingerprint database is divided into multiple subsets according to different WNTO apparatuses, terminal sessions, or another rule, and therefore, the synchronization command message needs to carry the identifier of the terminal and the identifier of the target base station, so that the source base station extracts, according to the identifier of the terminal, a fingerprint database subset required by the target base station.

Step 304d: When the source base station successfully synchronizes the fingerprint database to the target base station, the data transmission apparatus compresses the downlink data by using a WNTO technology. After the target base station receives the fingerprint database sent by the source base station, the data transmission apparatus compresses the downlink data according to a preset fingerprint database of the source base station by using the WNTO technology.

Step 304e: The data transmission apparatus sends, to the target base station, compressed downlink data obtained after the downlink data is compressed by using the WNTO technology, so that the target base station decompresses the compressed downlink data according to the fingerprint database by using the WNTO technology. After receiving the fingerprint database sent by the source base station, the target base station can decompress the compressed downlink data according to the fingerprint database of the source base station by using the WNTO technology.

Further, when the source base station does not successfully synchronize the fingerprint database to the target base station, the network-side data transmission apparatus does not compress the uplink data and the downlink data by using the WNTO technology, but directly sends the uplink data after receiving the uplink data sent by the target base station, or directly sends the downlink data to the target base station.

To better understand the foregoing solution, this embodiment of the present application provides details of step 305, and describes in detail how to transmit the uplink data and the downlink data in a scenario of step 305.

Figure 3C:
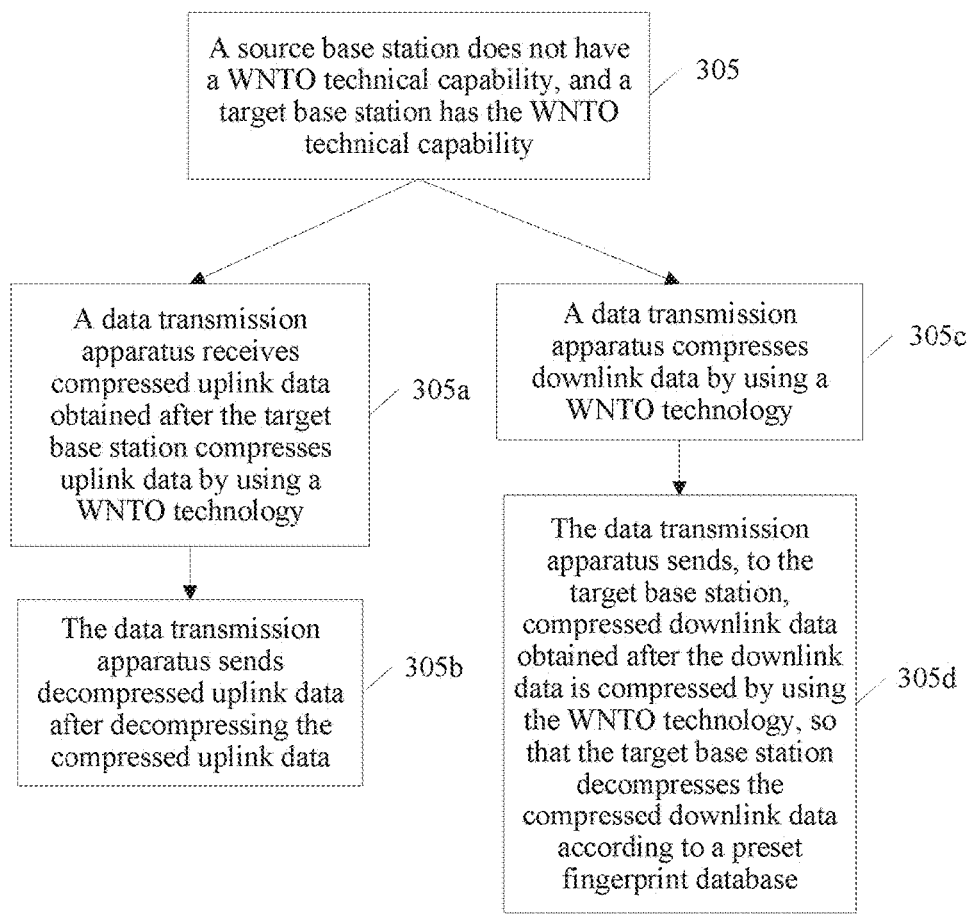
FIG. 3c is a second schematic sub-flowchart of a data transmission method according to an embodiment of the present application.

As shown in FIG. 3c, FIG. 3c is a second schematic sub-flowchart of a data transmission method according to an embodiment of the present application.

Step 305a: The data transmission apparatus receives compressed uplink data obtained after the target base station compresses the uplink data by using a WNTO technology. The target base station has the WNTO technical capability, and sends the compressed uplink data after compressing, by using the WNTO technology, the uplink data sent to the network-side data transmission apparatus.

Step 305b: The data transmission apparatus sends decompressed uplink data after decompressing the compressed uplink data. The network-side data transmission apparatus has a fingerprint database of all base stations that have the WNTO technical capability and that are connected to the data transmission apparatus, and can decompress the compressed uplink data according to a preset fingerprint database of the target base station by using the WNTO technology.

Step 305c: The data transmission apparatus compresses the downlink data by using a WNTO technology. The data transmission apparatus determines that the source base station does not have the WNTO technical capability and the target base station has the WNTO technical capability, and the data transmission apparatus compresses the downlink data according to a preset fingerprint database of the target base station by using the WNTO technology.

Step 305d: The data transmission apparatus sends, to the target base station, compressed downlink data obtained after the downlink data is compressed by using the WNTO technology, so that the target base station decompresses the compressed downlink data according to the preset fingerprint database. The target base station is preconfigured with the fingerprint database of the target base station, and can decompress the compressed downlink data.

To better understand the foregoing solution, this embodiment of the present application provides details of step 306, and describes in detail how to transmit the uplink data and the downlink data of the target base station in a scenario of step 306.

Figure 3D:
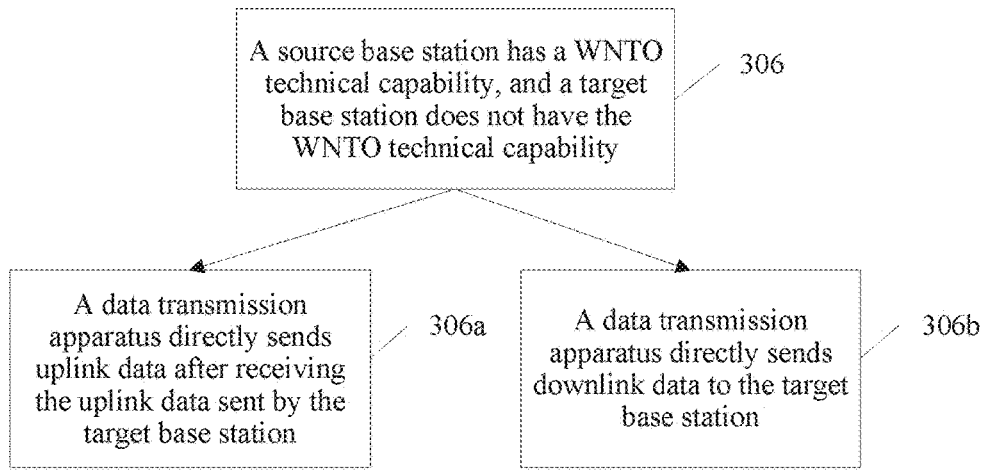
FIG. 3d is a third schematic sub-flowchart of a data transmission method according to an embodiment of the present application.

As shown in FIG. 3d, FIG. 3d is a third schematic sub-flowchart of a data transmission method according to an embodiment of the present application.

Step 306a: The data transmission apparatus directly sends the uplink data after receiving the uplink data sent by the target base station. The target base station does not have the WNTO technical capability, cannot compress the uplink data, and therefore, directly sends the uplink data to the network-side data transmission apparatus.

Step 306b: The data transmission apparatus directly sends the downlink data to the target base station. The target base station does not have the WNTO technical capability, and cannot decompress compressed downlink data obtained after the downlink data is compressed by using the WNTO technology; therefore, the network-side data transmission apparatus directly sends the downlink data to the target base station.

Figure 4:
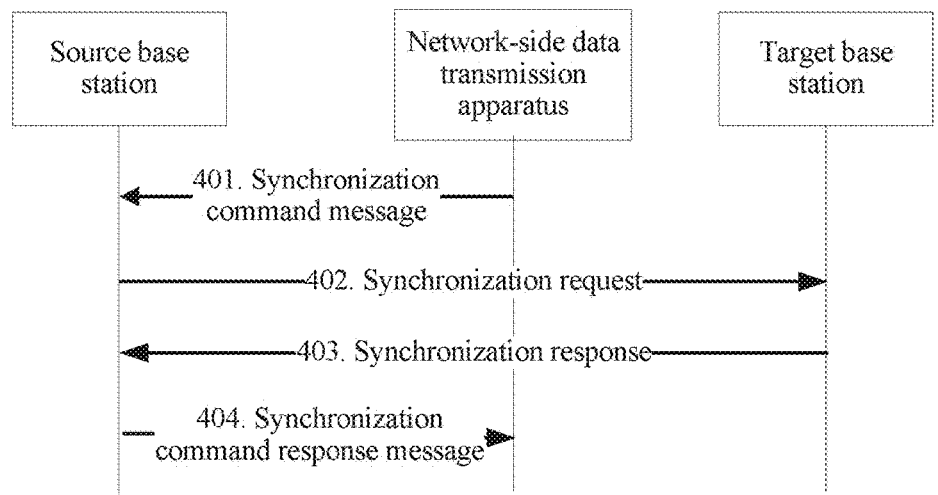
FIG. 4 is a schematic flowchart of fingerprint database synchronization in a data transmission method according to an embodiment of the present application.

In addition, when a terminal is handed over from being served by a source base station to being served by a target base station, and a network-side data transmission apparatus determines that both the source base station and the target base station have a WNTO technical capability, the source base station synchronizes a fingerprint database to the target base station. A fingerprint database synchronization process is shown in FIG. 4, and FIG. 4 is a schematic flowchart of fingerprint database synchronization.

Step 401: For a synchronization command message: the network-side data transmission apparatus sends the synchronization command message to the source base station, where the synchronization command message carries an identifier of the terminal that is handed over and an identifier of the target base station.

Step 402: For a synchronization request: the source base station sends a synchronization request message to the target base station, where the synchronization request message carries the identifier of the terminal that is handed over, and a fingerprint database subset that needs to be synchronized.

Step 403: For a synchronization response: the target base station receives the synchronization request message, combines the received identifier of the terminal and the received fingerprint database subset into a fingerprint database of the target base station, and sends a synchronization response message to the source base station, where the synchronization response message carries an identifier indicating that the fingerprint database is successfully or unsuccessfully synchronized.

Step 404: For a synchronization command response message: the source base station sends the synchronization command response message to the network-side data transmission apparatus, where the synchronization command response message carries a fingerprint database synchronization result. When determining that the fingerprint database is successfully synchronized, the network-side data transmission apparatus performs step 304d. When determining that the fingerprint database is unsuccessfully synchronized, the network-side data transmission apparatus does not compress uplink data and downlink data by using a WNTO technology, but directly sends the uplink data after receiving the uplink data sent by the target base station, or directly sends the downlink data to the target base station.

If an X2 interface exists between the source base station and the target base station, the source base station synchronizes the fingerprint database to the target base station through the X2 interface; otherwise, after being forwarded by a core network, the fingerprint database is synchronized to the target base station through an S1 interface.

It should be noted that, if synchronization fails once, the network-side data transmission apparatus may send multiple synchronization command messages to the source base station, so that the source base station responds to the synchronization command messages and synchronizes the fingerprint database.

This embodiment of the present application is applied to a scenario in which a terminal is handed over from being served by a source base station to being served by a target base station in a wireless network, resolves problems of fingerprint database synchronization and compression optimization decision required when a network transmission optimization NTO technology is deployed at both ends, and can reduce occupation of transmission bandwidth of a base station, and reduce a transmission delay of the wireless network.

To better implement the data transmission method provided in the embodiments of the present application, the embodiments of the present application further provide an apparatus based on the foregoing data transmission method. Meanings of nouns are the same as those in the foregoing data transmission method. For specific implementation details, reference may be made to descriptions in method embodiments.

Figure 5:
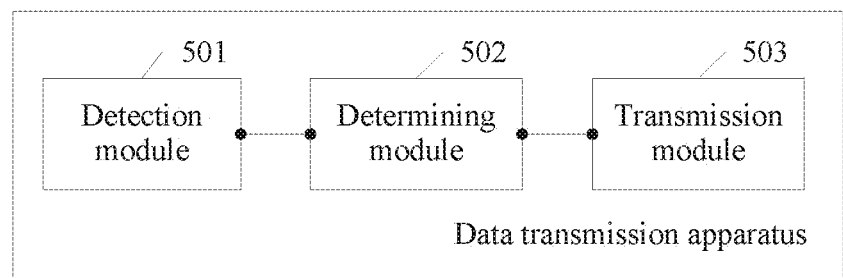
FIG. 5 is a schematic structural diagram of a data transmission apparatus according to an embodiment of the present application.

As shown in FIG. 5, FIG. 5 is a schematic structural diagram of a data transmission apparatus according to an embodiment of the present application, and the apparatus may include:

a detection module 501, configured to detect that a terminal is handed over from being served by a source base station to being served by a target base station:

a determining module 502, configured to: when the detection module 501 detects that the terminal is handed over from being served by the source base station to being served by the target base station, determine whether the source base station and the target base station have a WNTO technical capability; and a transmission module 503, configured to complete transmission of uplink data or downlink data according to each WNTO technical capability of the source base station and the target base station determined by the determining module 502.

Specifically, the transmission module 503 is further configured to: when the determining module 502 determines that both the target base station and the source base station have the WNTO technical capability, receive compressed uplink data obtained after the target base station compresses the uplink data by using a WNTO technology, and send decompressed uplink data after decompressing the compressed uplink data; or send a synchronization command message to the source base station, so that the source base station synchronizes a fingerprint database to the target base station, where the synchronization command message carries an identifier of the terminal and an identifier of the target base station.

When the source base station successfully synchronizes the fingerprint database to the target base station, the downlink data is compressed by using a WNTO technology, and compressed downlink data obtained after the downlink data is compressed by using the WNTO technology is sent to the target base station, so that the target base station decompresses the compressed downlink data according to the fingerprint database by using the WNTO technology.

Specifically, the transmission module 503 is further configured to: when the determining module 502 determines that the target base station has the WNTO technical capability and the source base station does not have the WNTO technical capability, receive compressed uplink data obtained after the target base station compresses the uplink data by using a WNTO technology, and send decompressed uplink data after decompressing the compressed uplink data; or compress the downlink data by using a WNTO technology, and send, to the target base station, compressed downlink data obtained after the downlink data is compressed by using the WNTO technology, so that the target base station decompresses the compressed downlink data according to a preset fingerprint database.

Specifically, the transmission module 503 is further configured to: when the determining module 502 determines that the target base station does not have the WNTO technical capability and the source base station has the WNTO technical capability, directly send the uplink data after receiving the uplink data sent by the target base station; or directly send the downlink data to the target base station.

It should be noted that, for specific implementation of the data transmission apparatus, reference may be made to the foregoing method embodiments, and details are not described herein.

Figure 6:
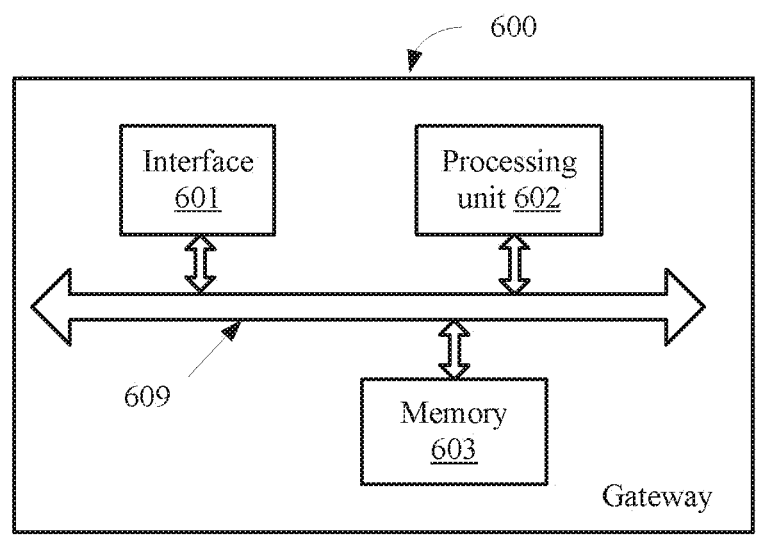
FIG. 6 is a schematic structural diagram of a data transmission apparatus (gateway) according to an embodiment of the present application.

The present application further provides a data transmission apparatus for data transmission, and the data transmission apparatus may be a network-side network element, for example, a gateway, or a functional chip or a board on the gateway. FIG. 6 is a schematic structural diagram of the data transmission apparatus. The data transmission apparatus of FIG. 6 includes an interface 601, a processing unit 602, and a memory 603. The processing unit 602 controls an operation of a gateway 600. The memory 603 may include a read-only memory and a random access memory, and provides an instruction and data to the processing unit 602. A part of the memory 603 may further include a non-volatile random access memory (NVRAM). Components of the gateway 600 are coupled together by using a bus system 609, where in addition to a data bus, the bus system 609 includes a power bus, a control bus, and a status signal bus. However, for clear description, various types of buses are marked as the bus system 609 in the figure.

The method for sending the foregoing uplink data and downlink data disclosed in the foregoing embodiments of the present application may be applied to the processing unit 602, or be implemented by the processing unit 602. In an implementation process, steps in the foregoing method may be completed by means of an integrated logic circuit of hardware in the processing unit 602 or an instruction in a form of software. The processing unit 602 may be a general purpose processor, a digital signal processor, an application-specific integrated circuit, a field programmable gate array, or another programmable logical device, discrete gate or transistor logical device, or discrete hardware component, and the processing unit 602 may implement or execute the methods, steps, and logical block diagrams disclosed in the embodiments of the present application. The general purpose processor may be a microprocessor, any conventional processor, or the like. Steps of the methods disclosed with reference to the embodiments of the present application may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 603, and the processing unit 602 reads information in the memory 603 and completes the steps in the foregoing methods in combination with hardware of the processing unit 602.

Figure 7:
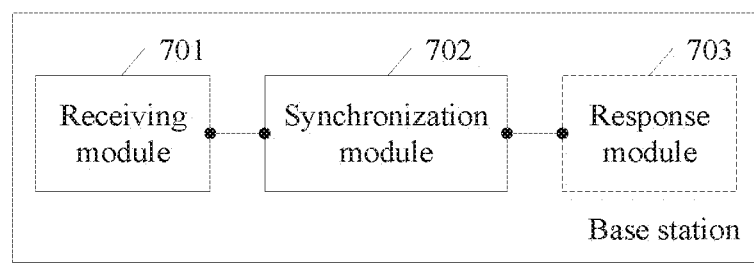
FIG. 7 is a schematic structural diagram of a data transmission apparatus (base station) according to an embodiment of the present application.

The present application further provides a data transmission apparatus, and the data transmission apparatus may be a base station or an access point. Referring to FIG. 7, FIG. 7 is a schematic structural diagram of a data transmission apparatus according to an embodiment of the present application, and the data transmission apparatus is used as a source base station, including:

a receiving module 701, configured to receive a synchronization command message, where the synchronization command message carries an identifier of a terminal and an identifier of a target base station; and a synchronization module 702, configured to: extract a fingerprint database according to the identifier of the terminal, and synchronize the fingerprint database to the target base station.

Further, the source base station may further include: a response module 703, configured to send a synchronization command response message to a gateway, so that the gateway compresses downlink data by using an NTO technology, and sends compressed downlink data obtained after the downlink data is compressed by using the NTO technology to the target base station.

It should be noted that, for specific implementation of the data transmission apparatus, reference may be made to the foregoing method embodiments, and details are not described herein.

Figure 8:
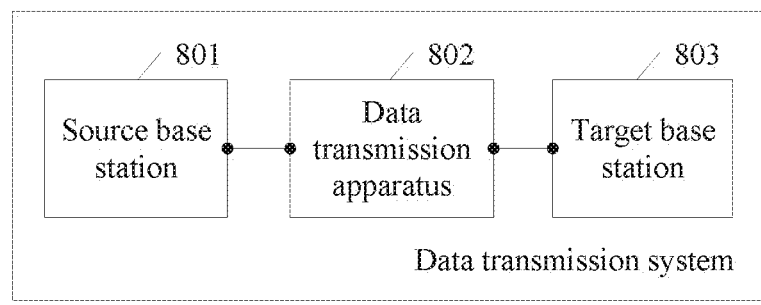
FIG. 8 is a schematic structural diagram of a data transmission system according to an embodiment of the present application.

In addition, the present application further provides a data transmission system. Referring to FIG. 8, FIG. 8 is a schematic structural diagram of a data transmission system according to an embodiment of the present application, and the data transmission system may include: a source base station 801, a data transmission apparatus 802, and a target base station 803. Apparatuses in the system are configured to separately perform each method implementation manner described above, which includes but is not limited to methods shown in FIG. 2, FIG. 3a, FIG. 3b. FIG. 3c, FIG. 3d, and FIG. 4. Details are not described herein.

In the foregoing embodiments, the description of each embodiment has respective focuses. For a part that is not described in detail in an embodiment, reference may be made to related descriptions in other embodiments.

In the several embodiments provided in the present application, it should be understood that the disclosed system, apparatus, and method may be implemented in other manners. For example, the described apparatus embodiment is merely exemplary. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Functional units in the embodiments of the present application may be integrated into one processing unit, or each of the units may exist alone physically, or two or more units are integrated into one unit. The integrated unit may be implemented in a form of hardware, such as integrated circuits, or may be implemented in a form of a processing circuit executing a software functional unit.

The foregoing describes in detail a data transmission method and system, and a related apparatus that are provided in the present application. In this specification, specific examples are used to describe the principle and implementation manners of the present application, and the description of the foregoing embodiments is only intended to help understand the method and core idea of the present application. Meanwhile, a person skilled in the art may, based on the idea of the present application, make modifications with respect to the specific implementation manners and the application scope. Therefore, the content of this specification shall not be construed as a limitation to the present application.

What is claimed is:

1. A data transmission method, comprising:

detecting, by a data transmission apparatus, that a terminal is handed over from being served by a source base station to being served by a target base station;

determining, by the data transmission apparatus according to a fingerprint database, whether the source base station and the target base station have a wireless network transmission optimization (WNTO) technical capability; and completing data transmission according to each determined WNTO technical capability of the source base station and the target base station, wherein the determining, by the data transmission apparatus, whether the source base station and the target base station have the wireless network transmission optimization (WNTO) technical capability comprises:

determining, by the data transmission apparatus, that both the source base station and the target base station have the WNTO technical capability, and the completing the data transmission according to each determined WNTO technical capability of the source base station and the target base station comprises:

sending, by the data transmission apparatus, a synchronization command message to the source base station, so that the source base station synchronizes the fingerprint database to the target base station, wherein the synchronization command message carries an identifier of the terminal and an identifier of the target base station; and when the source base station successfully synchronizes the fingerprint database to the target base station, compressing, by the data transmission apparatus, downlink data by using a WNTO technology, and sending, to the target base station, compressed downlink data obtained after the downlink data is compressed by using the WNTO technology, so that the target base station decompresses the compressed downlink data according to the fingerprint database by using the WNTO technology.

2. A data transmission apparatus, wherein the data transmission apparatus comprises: a processor, a memory, and an interface that are coupled via a bus, wherein the interface is configured to communicate with another network element, the memory is configured to store instructions, and the processor is configured to execute the instructions to:

detect that a terminal is handed over from being served by a source base station to being served by a target base station;

determine, according to a fingerprint database, whether the source base station and the target base station have a wireless network transmission optimization (WNTO) technical capability; and complete data transmission according to each determined WNTO technical capability of the source base station and the target base station, wherein the processor is configured to execute the instructions to:

determine that both the source base station and the target base station have the WNTO technical capability;

send, via the interface, a synchronization command message to the source base station, so that the source base station synchronizes the fingerprint database to the target base station, wherein the synchronization command message carries an identifier of the terminal and an identifier of the target base station; and when the source base station successfully synchronizes the fingerprint database to the target base station, compress downlink data by using a WNTO technology, and send, via the interface, to the target base station, compressed downlink data obtained after the downlink data is compressed by using the WNTO technology, so that the target base station decompresses the compressed downlink data according to the fingerprint database by using the WNTO technology.

3. A data transmission system, comprising:

a data transmission apparatus, a source base station, and a target base station, wherein the data transmission apparatus comprises: a processor, a memory, and an interface that are coupled via a bus, wherein the interface is configured to communicate with another network element, the memory is configured to store instructions, and the processor executes the instructions to:

detecting that a terminal is handed over from being served by the source base station to being served by the target base station;

determine, according to a fingerprint database, whether the source base station and the target base station have a wireless network transmission optimization (WNTO) technical capability; and complete data transmission according to each determined WNTO technical capability of the source base station and the target base station, wherein the processor executes the instructions to:

determine that both the source base station and the target base station have the WNTO technical capability;

send, via the interface, a synchronization command message to the source base station, so that the source base station synchronizes the fingerprint database to the target base station, wherein the synchronization command message carries an identifier of the terminal and an identifier of the target base station; and when the source base station successfully synchronizes the fingerprint database to the target base station, compress downlink data by using a WNTO technology, and send, via the interface, to the target base station, compressed downlink data obtained after the downlink data is compressed by using the WNTO technology, so that the target base station decompresses the compressed downlink data according to the fingerprint database by using the WNTO technology.

4. The method according to claim 1, wherein the determining whether the source base station and the target base station have the WNTO technical capability comprises:

when the terminal is detected as being handed over, obtaining, by the data transmission apparatus, the identifier of the terminal, an identifier of the source base station, and the identifier of the target base station, determining, by the data transmission apparatus, according to the identifier of the source base station, whether the source base station has the WNTO technical capability, and determining, by the data transmission apparatus, according to the identifier of the target base station, whether the target base station has the WNTO technical capability.

5. The method according to claim 1, further comprising:

when the source base station does not successfully synchronize the fingerprint database to the target base station, directly sending, by the data transmission apparatus, the downlink data to the target base station.

6. The apparatus according to claim 2, wherein the processor is further configured to execute the instructions to:

when the terminal is detected as being handed over, obtain the identifier of the terminal, an identifier of the source base station, and the identifier of the target base station, determine, according to the identifier of the source base station, whether the source base station has the WNTO technical capability, and determine, according to the identifier of the target base station, whether the target base station has the WNTO technical capability.

7. The apparatus according to claim 2, wherein the processor is further configured to execute the instructions to:

directly send, via the interface, the downlink data to the target base station, when the source base station does not successfully synchronize the fingerprint database to the target base station.

* * * * *